United States Patent [19]

Smith

[11] 4,053,704
[45] Oct. 11, 1977

[54] PLUG AND KIT OF PARTS INCLUDING SAME FOR USE IN FORMING A MOISTURE-PROOF CABLE SPLICE ENCLOSURE

[75] Inventor: Donald J. Smith, Woodland Hills, Calif.

[73] Assignee: Smith-Schreyer & Assoc., Inc., Woodland Hills, Calif.

[21] Appl. No.: 614,912

[22] Filed: Sept. 19, 1975

Related U.S. Application Data

[63] Continuation-in-part of Ser. No. 307,593, Nov. 17, 1972, Pat. No. 3,934,076, which is a continuation-in-part of Ser. No. 171,570, Aug. 13, 1971, abandoned.

[51] Int. Cl.² ............................................. H02G 15/08
[52] U.S. Cl. ........................................ 174/87; 174/76; 174/138 F; 215/329; 220/288; 339/116 C
[58] Field of Search ................... 174/76, 77 R, 82, 87, 174/91, 93, 135, 138 F; 339/114, 115 R, 115 C, 116 R, 116 C, 209; 215/329; 220/288, DIG. 19

[56] References Cited

U.S. PATENT DOCUMENTS

| 2,906,810 | 9/1959 | D'Ascoli | 174/87 |
| 3,937,870 | 2/1976 | Bumpstead et al. | 174/87 |

*Primary Examiner*—Laramie E. Askin
*Attorney, Agent, or Firm*—Lyon & Lyon

[57] ABSTRACT

A kit of parts for forming an enclosure for a cable splice that rigidly fixes two or more spliced cables and moisture proofs the splice and exposed cable ends. The kit includes a vial partially filled with a body of sealant and a plug which receives the cable ends and then may be positioned in the vial and partially immersed in the body of sealant. By immersing the plug in the body of sealant, the sealant is forced upwardly and around the cable ends to fully enclose the cable splice and the cable ends in the sealant. Arms associated with the plug act to retain the plug on the vial.

7 Claims, 4 Drawing Figures

U.S. Patent      Oct. 11, 1977      4,053,704
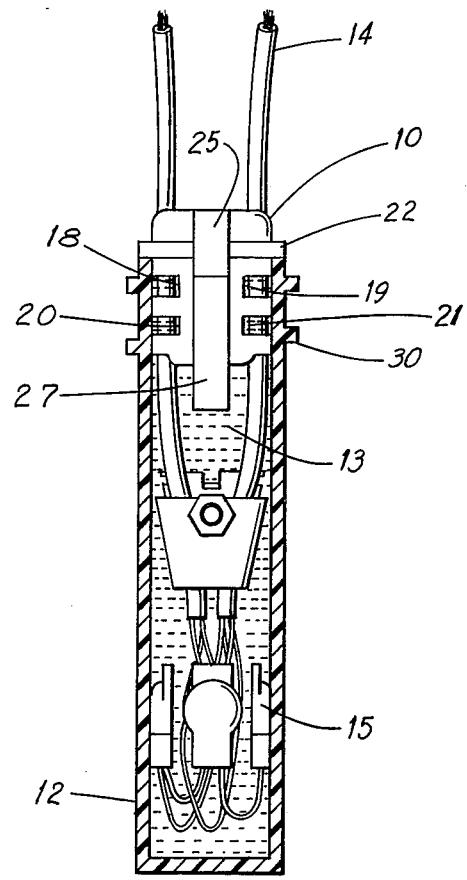
FIG. 2
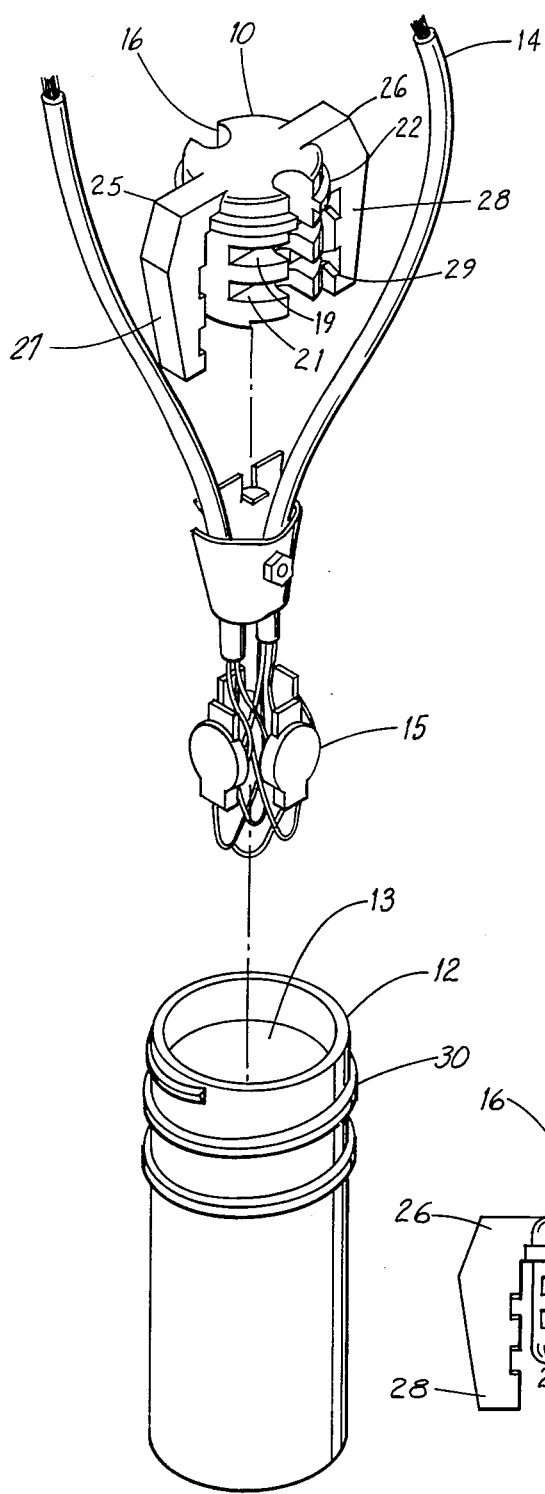
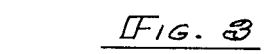
FIG. 1      FIG. 3      FIG. 4

PLUG AND KIT OF PARTS INCLUDING SAME FOR USE IN FORMING A MOISTURE-PROOF CABLE SPLICE ENCLOSURE

BACKGROUND OF THE INVENTION

This application is a continuation-in-part of co-pending application, Ser. No. 307,593, filed Nov. 17, 1972, now U.S. Pat. No. 3,934,076. The above-mentioned application was in turn a continuation-in-part of application Ser. No. 171,570, filed Aug. 13, 1971, now abandoned.

There are many instances where an electrical cable splice must be insulated and protected from the effects of the environment in which it is used. For example, in splicing a telephone service cable to the main cable, particularly in underground installations, protection must be afforded against the deleterious effects of moisture, not only on the electrical connection itself, but on the long lengths of the cable which the moisture may reach as a result of the effects of hydrostatic pressure and capillary action.

At present, a commonly used moisture-proof cable splice enclosure for this purpose requires the placing of the splice in a suitable container filled with activated resin. After setting, the hardened resin, combined with the container, provides a certain amount of structural rigidity and prevents moisture from reaching the splice and the exposed ends of the cables.

Several disadvantages of the technique are apparent and result primarily from the use of a sealing material which must be first activated and then cured to a hardened state. At the time of installation, the resin must be mixed with a catalytic compound, poured into the container and cured for some period of time. The mixing and pouring of the resin involves separate containers and mixers, the end result of which is a general clean-up problem. The installer must also take great care when mixing the resin and when immersing the splice and cables so as to prevent the entrapment of air in the mixture which later could provide a cavity for the transmission of water or significantly weaken the structural ability of the resin. Lastly, the resin requires time to cure or harden. This curing time is mandatory because of the exothermic nature of the reaction which, if allowed to occur too quickly, may cause heat damage to the splice or the resin. During this curing time, the splice and cables must be maintained in a fixed position so as to prevent the creation of gaps caused by the relative motion of the embedded items with respect to the partially set up resin.

SUMMARY OF THE INVENTION

According to the present invention, a moisture proof cable splice enclosure is provided unassembled for use in moisture proofing cable splices made either in the shop or in the field. The enclosure can be installed in a matter of seconds without any mixing procedure, curing time or mess. The invention also precludes the possibility of the assembler improperly mixing or curing the seal. These advantages are obtained through the use of a vial which has been pre-filled with a specific amount of sealant not miscible with water, and a plug which rigidly holds the cables in place and closes the open end of the vial.

The cables, already spliced in a conventional manner, are positioned in longitudinally extending grooves of the plug with the splice and cable ends projecting beyond one end of the plug. The plug is then inserted into the vial with the splice, cable ends and part of the plug immersed in the sealant. The plug is preferably fabricated so as to cause the sealant displaced by the splice, cable ends and a portion of the plug to fill any voids between the plug, the walls of the vial, and the cables, and provide a highly efficient seal precluding the intrusion of moisture. Slots extending across the grooves allow the sealant to completely encircle the cable ends at a plurality of locations to insure a continuous seal around the cable ends.

Once assembled, the waterproofed splice and cable ends are ready to be positioned in the ground or any other similar moist environments. The vial and plug configuration may also include means for mechanically forcing the plug assembly into the vial to aid the installer and allow employment of more viscous sealants.

As can readily be seen, the present invention provides a quickly assembled, highly reliable, problem-free water-proof cable splice enclosure. Because the sealant is prepacked in the vial and in its final form, there is no mixing, filling or curing problem. No extra equipment is necessary to assemble the enclosure, and no time is wasted for the seal to cure or dry. Also, the number of operations required of the assembler is reduced which in turn reduces the probability of human error. Because the plug, rather than the sealant as in the case of a resin filled vial, supports all loads, there is less chance that a minor failure under load of the enclosure will cause the moisture-proofing material to fail in its function. In addition, the splice can be removed if that should prove desirable. Since the sealant is of an inert nature, any leakage of the sealant from the enclosure is not likely to cause damage to the surroundings.

BRIEF DESCRIPTION OF THE DRAWINGS

FIG. 1 is an exploded perspective view of the moisture-proof cable splice enclosure of the present invention with two cables spliced together.

FIG. 2 is an assembled view, partly in section, of the cable splice enclosure of the present invention.

FIG. 3 is a front elevation of the plug of the present invention.

FIG. 4 is a cross-sectional view taken along line 4—4 of FIG. 3.

DESCRIPTION OF THE INVENTION

A plug 10 is constructed to cooperate with a vial 12 and a body of sealant 13 to protect a part of cables 14 spliced together by a conventional means 15. The sealant 13 is preferably a silicone grease or petroleum jelly but may be any other suitable substance not miscible with water, and which does not set up but rather stays flowable for the normal life of the splice.

The plug 10 is generally cylindrical in shape and includes two or more longitudinal grooves 16 and 17 extending the length of the plug 10. These longitudinal grooves 16 and 17 are appropriately sized to permit receipt of standard cables 14. At the same time, it is preferrable that the cables 14 fit snugly into the grooves 16 and 17 such that the cables will not be easily extracted from the grooves when positioned in the assembled enclosure. It is also of benefit that the grooves 16 and 17 be sufficiently deep to allow the cables 14 to sit inwardly from the outer cylindrical surface of the plug 10. This insures that the cables will be displaced inwardly from the vial 12 so that sealant 13 may be interposed between the vial 12 and the cables 14 when in the assembled enclosure. However, a large displacement of the cables 14 inwardly from the outer surface of the plug 10 is not suggested in that a large, direct sealant passage through the enclosure is not advantageous. It has been found that U-shaped groove having a semi-circular bottom and having a total depth approximately 1/16 inch (0.16 cm.) greater than the width of the grooves is satisfactory. In this way, the cables 14 can be forced into the grooves 16 and 17 where they are tightly held and where a small sealant passageway exists such that the outside of the cables will be covered by sealant when the enclosure is assembled.

Slots 18, 19, 20 and 21 are defined in the body of the plug 10 across the longitudinal grooves 16 and 17. The slots 18-21 extend inwardly of the grooves 16 and 17 as can best be seen in FIG. 4. The depth of the slots 18-21 allows sealant 13 to flow inwardly about the cables 14 to form complete rings of sealant around the cables 14 at each slot 18-21. Thus, a plurality of individual sealant areas are formed to insure the complete seal of the cables 14.

A flange 22 extends outwardly about the upper portion of the body of the plug 10. This flange comes to rest on the upper edge of the vial 12 when the plug is fully inserted into the vial. In this way, a physical barrier is provided to close off even the narrow space between the plug 10 and the vial 12. The plug 10 extends from the flange 22 downwardly a sufficient distance to bring about displacement of the body of sealant 13 upwardly about the sides of the plug 10, through the grooves 16 and 17 and into the slots 18-21. Slots 18 and 19 and slots 20 and 21 communicate with one another through passageways 23 and 24 to further enhance flow of the sealant upwardly about the plug 10 as the plug 10 is forced into the vial 12.

To facilitate placement of the plug 10 in the vial 12 and insure retention of the plug 10 in the vial 12, two arms 25 and 26 extend outwardly from the upper portion of the plug 10. Each arm 25 and 26 has a depending portion 27 and 28 with inwardly disposed teeth 29 which may be caused to grip threads 30. The threads 30 allow mechanical placement of the plug 10 through the simple twisting of the vial 12. With the plug fully inserted into the vial 12, assembly of the enclosure is complete By engulfing the splice, and filling all of the gaps around the plug, the sealant provides an effective waterproof seal. As soon as the plug has been positioned in the vial, the entire closure is ready to be placed in the ground or other similar moist environment.

Thus, a convenient and inexpensive moisture proof cable splice enclosure is formed which is supplied to fill the operations in kit form where it may be used to quickly and conveniently form moisture-proof enclosures about a variety of cable splices. While embodiments and applications of this invention have been shown and described, it would be apparent to those skilled in the art that many more modifications are possible without departing from the inventive concepts herein described. The invention, therefore, is not to be restricted except as is necessary by the prior art and by the spirit of the appended claims.

What is claimed is:

1. A plug for use with a vial in a cable splice enclosure, comprising
    a body, said body including longitudinally extending grooves for receiving cables and transverse slots extending across said grooves and cutting deeper into said body than said grooves; and
    a pair of arms extending outwardly from said body, each of said arms having a depending portion bearing a plurality of teeth directed toward said body for engaging a vial.

2. The plug of claim 1 wherein said grooves are two in number.

3. The plug of claim 1 wherein said body is cylindrical.

4. The plug of claim 1 wherein two said slots are associated with each said groove.

5. The plug of claim 1 wherein said body is cylindrical, two said grooves extend longitudinally along the outside surface of said body, two said slots extend transversely across said body in association with each of said grooves and said body further includes passageways extending transversely through said body to provide communication between said slots.

6. A kit of parts for forming an enclosure for moisture-proofing cable splices and cable ends associated therewith, comprising
    a vial, said vial having a mouth and an interior volume for accepting a cable splice;
    a body of sealant contained in said vial for receiving a cable splice and the ends of cables to be positioned in said vial;
    a plug having means for accepting a plurality of cables in the immediate promixity of a cable splice, said plug being for fitting within and enclosing the mouth of said vial, said plug having a body capable of extending into said body of sealant to force said body of sealant to deform around said plug and cable ends to fill all passageways leading from the vial, said plug body including longitudinally extending grooves for receiving cables and transverse slots extending across said grooves and cutting deeper into said plug body than said grooves.

7. A kit of parts for forming an enclosure for moisture-proofing a cable splice, comprising
    a plug having means for accepting a plurality of cables relative to said plug in the immediate proximity of a cable splice, said plug including a body, said body including longitudinally extending grooves for receiving cables and transverse slots extending across said grooves and cutting deeper into said body than said grooves;
    a vial adapted to receive said plug for closure of said vial, said vial being of sufficient size to accept a cable splice;
    a body of sealant contained in said vial for receiving a cable splice;
    threads located on said vial; and
    grasping means positioned on said plug for receiving said threads with the plug not fully closing said vial, said grasping means being capable of drawing said plug forcibly into said vial to fully close said vial and force said sealant body outwardly about said plug.

* * * * *